Patented Nov. 21, 1939

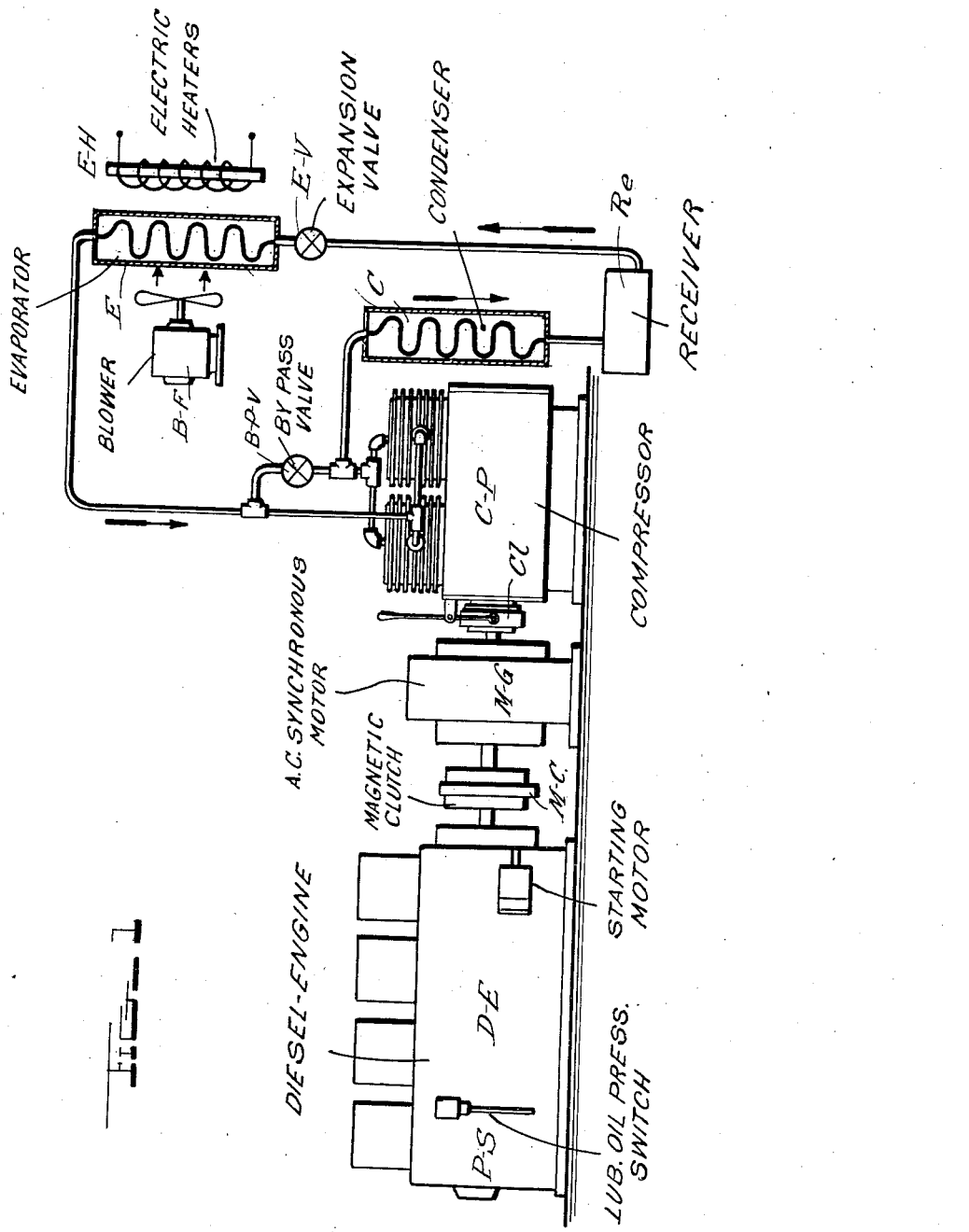

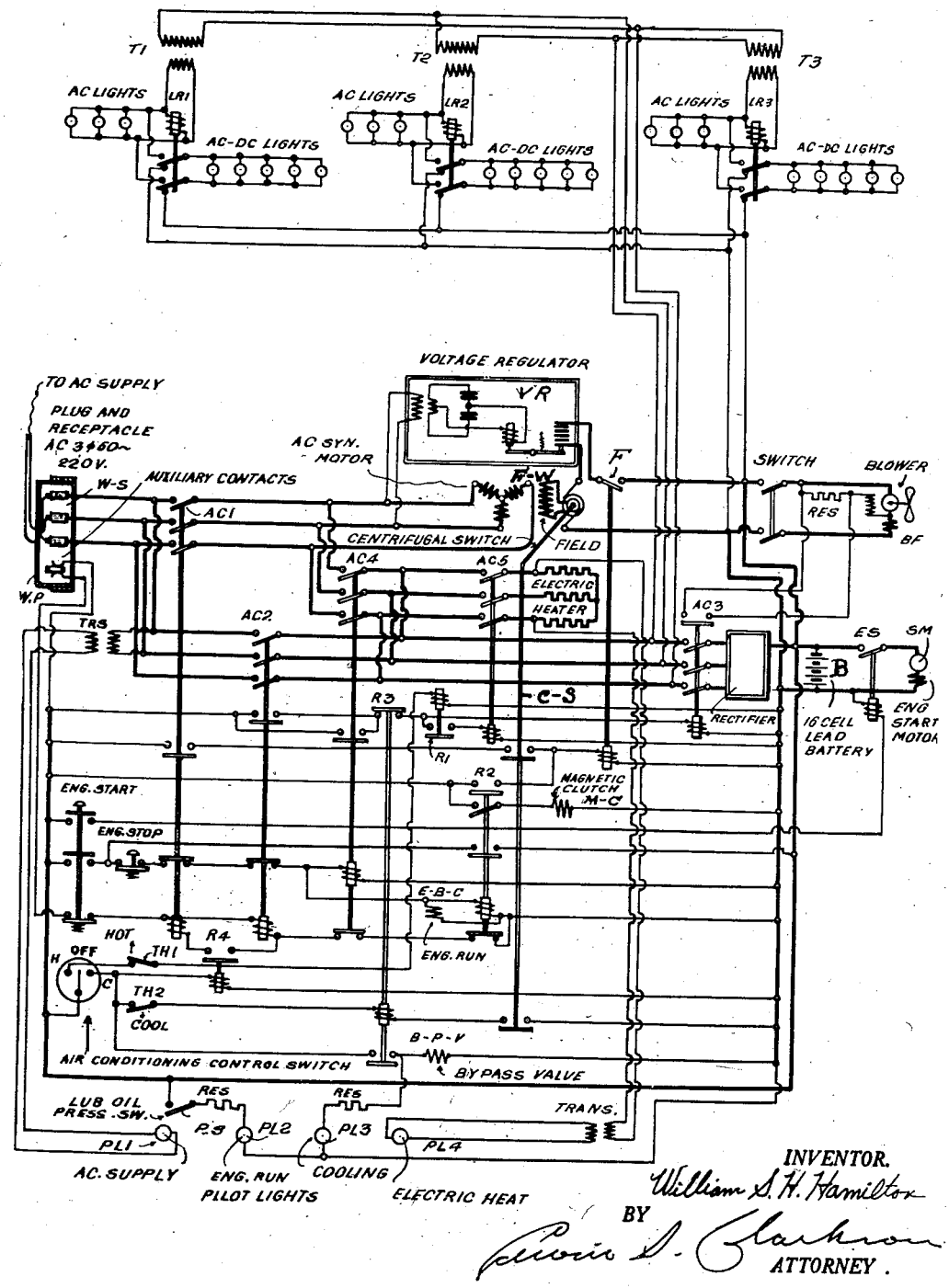

2,181,053

UNITED STATES PATENT OFFICE 2,181,053

AIR CONDITIONING

William S. H. Hamilton, Larchmont, N. Y., assignor to The New York Central Railroad Company, a corporation of New York Application August 9, 1938, Serial No. 223,958

18 Claims. (Cl. 257—3)

This invention relates to an air conditioning and illuminating system for railway passenger cars, and the general object of the invention is to provide a simple, reliable and comparatively inexpensive system of this character designed for either cooling or heating the circulated air and also for illuminating the car.

The present invention provides for these purposes a system using a Diesel engine to drive its working parts, this engine being large enough to handle the load on one car only. It is therefore different from other systems so far developed which use a Diesel engine generator set at the head end of a train to furnish power to a number of cars throughout the train.

It is uneconomical to design an air conditioning system for modern passenger cars and disregard the energy requirements for lighting and battery charging. The blower which is used to circulate air within the car is of necessity a very important piece of apparatus in such a system and means must be taken to guard against its failure so far as is reasonably possible. The best way to insure continuity of operation is to connect it to a storage battery with suitable means for recharging the same.

It is also necessary, especially on certain railroads, to provide means for operation of the air conditioning system without running the Diesel engine, on account of objections to noise and exhaust gas odors in congested terminals, etc.

Since the Diesel engine will have to operate during the winter in order to provide energy for lights and battery charging when the total output required will be low on account of the air conditioning compressor not being operated, some of the available capacity is also utilized for an electric heater located near the evaporator in the air discharge from the blower. This has the advantage that the circulated air can be kept reasonably warm while steam is off the car during changes at terminals, etc., and not make it necessary to shut down the blower at this time.

My invention provides a system which meets these conditions while reducing to a possible minimum the required number of working parts and the expense of installation and maintenance.

In the accompanying drawings illustrating the invention—

Fig. 1 is a view showing the Diesel engine, synchronous motor, magnetic clutch and air conditioning elements of the system.

Fig. 2 is a wiring diagram of the circuits and associated parts of the system.

The system employs a Diesel engine D—E connected through a magnetic clutch M—C to an A. C. synchronous motor M—G and an air conditioning refrigerant compressor C—P. The Diesel engine is approximately 25 H. P., the synchronous motor 23 H. P. (or 15 kw. as a generator) and the compressor of 6–7 tons capacity. The electric heater E—H shown is 6 kw.

The Diesel engine is arranged to operate at a constant speed under control of a governor (not shown) and this speed is assumed to be 1800 R. P. M. The A. C. synchronous motor is designed to operate at the same speed and is of the 3 phase, 220 volt type, this being the standard voltage available for stand-by service on most railroads. The air conditioning compressor can be either directly connected, as shown, to, or belt driven from, the shaft of the synchronous motor, as most convenient.

The cooling portion of the air conditioning system can be of any conventional type with a particular exception, that shown being of compressor-expander-condenser type including the compressor C—P, condenser C, evaporator or cooling coil E, receiver Re, expansion valve E—V, and associated piping. It is preferred to use a non-toxic volatile refrigerant, such as dichlorodifluoromethane, which may be directly expanded into the evaporator E, but any equivalent volatile refrigerant may be used. The particular exception noted is that of the provision of a by-pass B—P containing an electromagnetic by-pass valve B—P—V which is normally closed to permit normal circulation of the refrigerant, but which when opened will prevent flow of the refrigerant through the cooling circuit and allow only flow of the refrigerant vapor through the idling circuit formed by the by-pass and compressor as the latter operates. When the by-pass valve is open to permit such use of the by-pass circuit the synchronous motor may operate as a generator driven by the Diesel engine without supplying any cooling medium to the car at the same time. A magnetic clutch MC is provided for automatically connecting the Diesel engine with and disconnecting it from the synchronous motor. Means, such as a clutch Cl, may also be provided to disconnect the compressor from the synchronous motor during the winter or at other times when cooling is not required. While clutch MC is disclosed as a magnetic clutch it is also feasible to use in its stead a type of free wheel clutch in which the clutch engages and transmits power as soon as the speed of the Diesel engine exceeds the speed of the synchronous motor. Associated with the evaporator E and heater E—H is a blower fan B—F for circulating the air to be cooled or heated and supplied to the car.

The electric circuits of the system shown in Fig. 2 include, besides the synchronous motor, magnetic clutch, blower and heater, lights for illuminating the car and various operating and control features which I will now proceed to describe.

The synchronous motor is shown as a Y-connected motor although a delta-connected one could be used. The motor is provided with an amortisseur winding (not shown) for use in starting, also a field winding F—W excited from the battery B as shown.

A voltage regulator V—R is provided for holding constant voltage when the motor acts as a generator. This is shown as of the conventional carbon pile type, adapted to work from A. C. through a rectifier as shown, and in which a spring tends to operate an arm to compress the carbons and a solenoid tends to separate them as the voltage increases. Any of the other types of A. C. voltage regulators on the market could be used instead if desired.

The voltage regulator V—R also performs a second useful function in that when the synchronous motor is running as a motor it tends to maintain the line voltage constant by varying the field of the synchronous motor (and the power factor).

The synchronous motor is also provided with a centrifugal switch C—S which closes when a predetermined speed below synchronous speed is reached and this causes the field contactor F to close and excite the field.

The blower fan B—F for circulating air through the car is operated from the battery B which is indicated as a 16-cell battery of the lead type. Operation of the blower from the battery insures the greatest reliability and also insures that the supply of air will not be interrupted no matter how the rest of the system is being operated.

The blower is shown as compound wound with a small amount of resistance in the field circuit controlled by an interlock on contactor AC3, the purpose of this being to make the speed of the blower approximately the same when the battery is being charged from the rectifier R as when it is running from the battery, by weakening the field somewhat when the battery is not being charged.

The rectifier R for charging the storage battery can be any one of the conventional types of rectifiers now available. A motor generator set can be used instead if desired.

The layout of this system is such as to enable the size of battery B to be reduced to a minimum in order to secure minimum weight. Ordinarily a 16-cell, 300 a. h. lead battery will be found ample for the purposes required of it by this system. This contrasts with the 32 cell, 600 a. h. lead battery required for cars using the electro-mechanical system of air conditioning.

This system contemplates operating the car lights normally from A. C. through transformers indicated as T1, T2 and T3, the lamps themselves operating at 30 volts. These would be divided into two classes, those operated from A. C. only (marked "A. C. Lights") which are not lighted when A. C. supply is not available, and those operated either from A. C. supply or D. C. from the battery (marked "A. C.—D. C. Lights"). It is assumed that the lighting circuits would be so distributed in the car that with A. C. supply available and all lights turned on, approximate equal loading would be obtained on the 3 phases of the power supply.

Three transfer relays LR1, LR2 and LR3 are provided to transfer the A. C.—D. C. lights from D. C. to A. C. whenever this is available.

The relative number of A. C. or A. C.—D. C. lights would depend on the type of car under consideration and the amount of illumination required during the time that the only source of power supply on the car was from the battery.

It is to be noted particularly that the lights are never operated from the battery while it is being charged so that a lamp regulator is not required with this system.

The system is provided with push buttons marked "Engine start", "Engine stop", an air conditioning control switch (marked "H", "Off" and "C") and four pilot lights PL1, PL2, PL3, PL4, located in practice on a panel board in the car in approximately the same location as the regulator and control panels ordinarily used. The connections for controlling the air conditioning are indicated, but no attempt has been made to show all the details which are involved in such systems.

Of the four pilot lights, PL1 indicates when the external A. C. power supply is applied to the 220 volt receptacle, the PL2 indicates when the engine is running as shown by the closure of a pressure switch P—S connected to the lubricating oil system of the engine, the PL3 indicates when the car is cooling as indicated by the by-pass valve around the compressor being closed, and the PL4 indicates when electric heat is being used.

A number of contactors and relays are provided as shown and the functioning of each of these will be described below. They are all assumed to be of the magnetically operated type with D. C. coils connected to the battery.

In operating this system from the Diesel engine for cooling purposes the sequence will be as follows:

The push button marked "Engine start" is pressed which closes the contactor "ES" and applies current from the battery B to a small starting motor SM connected to the Diesel engine to turn it over so that it will commence firing. This button is held down until the "Engine run" pilot light PL2 glows, which will occur as soon as the engine has speeded up sufficiently to close a lubricating-oil-pressure-switch PS. As soon as this occurs the engine starting button can be released and the starting motor thereby disconnected from the battery.

Pressing the "Engine start" button also energizes a coil EBC marked "Engine run" which is assumed to represent an electrically operated mechanism in connection with the fuel injection pumps on the engine which when energized will enable the governor to move the fuel pump racks to the wide open position and secure full speed. Should this circuit be broken for any reason, de-energization of this coil will cause the racks controlling the fuel pumps to move to the "off" position in which no more fuel can be injected into the engine and the engine will stop. It will be noted that this engine starting button is by-passed by a contact on relay R—2 so that this particular circuit remains energized even after the engine starting button has been released. It is however broken and R—2 cut out should the "Engine stop" button be pressed at any time.

Relay R—2 also closes the circuit to the magnetic clutch so that the Diesel engine, as it comes up to speed, also brings the synchronous motor and compressor up to speed with it. Through another interlock on relay R—2, contactor F which controls the field of the synchronous motor is closed and this causes the voltage to build up under the control of the voltage regulator.

The circuit through the "Engine start" and "Engine stop" buttons also energizes the coil of contactor AC4 which picks up, providing AC1 and AC2 are open, and connects the lighting transformers T1, T2 and T3 to the A. C. supply. The lighting relays in LR1, LR2 and LR3 in turn pick up and transfer the A. C.-D. C. lights to the transformer circuits.

If the air conditioning control switch is now moved to the "C" position a circuit will be completed through the thermostat TH2 contacts (closed as shown if the car is warmer than the desired temperature), the centrifugal switch C—S on the synchronous motor and the coil of relay R3. Picking up of relay R3 energizes the by-pass valve and closes the by-pass around the compressor which will then commence to compress the refrigerant and cool the car.

It will be noted that this arrangement keeps the compressor from loading up until the Diesel engine and synchronous motor have reached nearly full speed, thus facilitating starting of the Diesel engine.

When the car has cooled sufficiently, the thermostat TH2 opens its contacts, deenergizing relay R3. This in turn deenergizes the by-pass valve, thus opening the by-pass and stopping the cooling action of the compressor.

The contactor AC3 through which power is supplied to the rectifier for charging the battery closes as soon as contactor R3 opens.

When it is desired to stop the Diesel engine the "Engine stop" button is pressed. This deenergizes relay R2 and the coil marked "Engine run". This latter moves the racks of the fuel injection pumps to the off position and stops the engine. All other circuits which have been described above are also deenergized and the lights transferred back to the battery.

In the use of the apparatus for heating air the engine is started in the manner described above. When the air conditioning control switch is moved to the "H" position, relay R1 is energized through thermostat TH1. Relay R1 in turn energizes the coil of contactor AC5, which connects the electric heater to the AC lines. When the car has heated up sufficiently thermostat TH1 opens its contacts and opens AC5, disconnecting the heater from the line.

In using a wayside source of current supply, assuming that the Diesel engine is shut down, and the air conditioning control switch is in the off position, the wayside plug WP is inserted in the wayside socket or receptacle W—S whereby the "auxiliary contacts" shown are closed and current from the battery energizes the coil of contactor AC2 through the bottom contact of "Engine start" button and interlocks on contactor AC4 and relay R2.

Closing of contactor AC2 supplies power to the lights and the transfer relays LR1, LR2 and LR3 pick up to the AC position. Closing of interlock on contactor AC2 also energizes contactor AC3 and furnishes current to the rectifier.

When the air conditioning control switch is moved to the C position, relay R4 is energized which allows contactor AC1 to close. Closing of contactor AC1 starts the synchronous motor.

As the magnetic clutch is not energized under these conditions, the Diesel engine remains at rest. As soon as the motor reaches the speed for which the centrifugal switch C—S is set this closes the field contactor F through the interlock on contactor AC1. This applies the field and pulls the motor into synchronism.

The voltage regulator operates to maintain constant voltage on the A. C. supply lines by varying the field strength and the power factor.

At the same time relay R3 is energized, the by-pass valve is energized through contacts on R3 and the compressor starts to operate and cool the car.

Closure of relay R3 opens the circuit to the coil of contactor AC3, disconnecting the rectifier from the line so long as the compressor is cooling.

When the car has cooled sufficiently contacts of thermostat Th2 open, deenergizing relay R3 and the by-pass valve. Deenergizing the by-pass valve allows the refrigerant to circulate through the compressor without cooling the car. Contactor AC3 can then again close and allow the rectifier to charge the battery.

It will be understood that while the interlocking which prevents the rectifier being operated while the compressor is cooling is desirable in order to reduce the load on the system, it is not absolutely necessary. If the size of the Diesel engine or the capacity of the wayside supply is made sufficiently large, the rectifier can be operated at the same time that the compressor is cooling. The connections shown have been included to prevent its operation with a view of limiting the demand from either the Diesel engine or the wayside supply.

Should the air conditioning control switch be moved to the off position, the synchronous motor will be shut down by the opening of relay R4 and contactor AC1.

If the air conditioning control switch is moved to the H position relay R1 will be closed. Closure of relay R1 energizes the coil of contactor AC5 connecting the heater to the A. C. supply. As soon as the car has heated up sufficiently the contacts of TH1 will open and disconnect the heater from the line. It will be noted that the rectifier and heater can be operated at the same time. This is necessary as the heater would probably be on most of the time in winter whereas the compressor would not be in summer.

Should the Diesel engine be started while the external A. C. supply is connected to the car, the operation of the "Engine start" button will deenergize contactors AC1 and AC2 and prevent any interference between the two sources of A. C. supply.

The foregoing describes the main interlocking actions between contactors, etc., and it is believed the rest will be apparent without further description.

It is to be understood that the electric heater described is only intended to temper the air being circulated and not to furnish the entire heating and that additional heat will be provided in the car, preferably from the usual steam heat line, to provide the total necessary for proper heating.

This system is best adapted for Diesel engine drive for the following reasons:

1. For standby operation in terminals, it is necessary to operate from 220 volt, 3 phase A. C., and in order to avoid conversion losses the motor driving the compressor must be operated from A. C. supply.

2. An A. C., 220 volt 3 phase synchonous motor, which can also be used as a generator, is lighter than a low voltage D. C. motor of the same rating.

3. Battery size can be reduced to a minimum, since the air conditioning is never operated from it.

4. Lights can be operated at most efficient voltage for incandescent lamps and new fluorescent lumiline lamps can readily be used.

5. Use of a rectifier avoids necessity of having an exciter or D. C. generator on the Diesel engine generator set thus keeping length to the minimum.

From the foregoing description, taken in connection with the drawings, the construction and mode of operation of my improved air conditioning and illuminating system for railway passenger cars will be readily understood without a further and extended description, and it will be seen that the invention provides a system which is simple of construction, reliable and efficient in action and which reduces the number of working parts to a high degree as compared with other similar systems, thereby making the system relatively inexpensive in construction, installation and operation as compared with prior systems.

While the organization shown is preferred, it will, of course, be understood that changes in the construction, arrangement and operation of the parts of the system within the scope of the appended claims, may be made without departing from the spirit or sacrificing any of the advantages of the invention.

What I claim is:

1. In a system of the character described, an electric circuit, a compressor, an A. C. synchronous electric motor in said circuit adapted to operate at a predetermined speed, said motor being coupled to the compressor to drive the same, means for connecting said circuit and motor with an outside source of current for supplying current to the circuit and operating the motor as such to drive the compressor, an internal combustion motor for driving the synchronous motor as a generator for supplying current to the circuit and for mechanically driving the compressor from the motor, and means operating when the internal combustion motor reaches a speed suitable for driving the synchronous motor at the predetermined speed for connecting said internal combustion motor to the synchronous motor.

2. In a system of the character described, an electric circuit, a compressor, an A. C. synchronous electric motor in said circuit designed to be driven at an assigned speed, said motor being coupled to the compressor to drive the same, means for connecting said circuit and motor with an outside source of current for supplying current to the circuit and for operating the motor as such to drive the compressor, an internal combustion motor designed to be driven substantially at the same speed as the electric motor for driving the electric motor as a generator and driving the compressor therethrough, and a clutch automatically operating at the assigned speed for coupling said internal combustion motor to the electric motor.

3. In a system of the character described, an electric circuit, a compressor, an A. C. synchronous electric motor in said circuit designed to be driven at an assigned speed, said motor being coupled to the compressor to drive the same, means for connecting said circuit and motor with an outside source of current for supplying current to the circuit and for operating the motor as such to drive the compressor, an internal combustion motor for driving the electric motor as a generator and driving the compressor therethrough, and electrically operated means for connecting the internal combustion motor at the assigned speed with the electric motor.

4. In a system of the character described, an electric circuit, a compressor, an A. C. synchronous electric motor in said circuit designed to be driven at an assigned speed, said motor being coupled to the compressor to drive the same, means for connecting said circuit and motor with an outside source of current for supplying current to the circuit and operating the motor as such to drive the compressor, an internal combustion motor designed to be driven substantially at the same speed as the electric motor for driving the electric motor as a generator and driving the compressor therethrough, an electrically operated clutch for connecting the internal combustion motor at the assigned speed with the electric motor, and means in the electric circuit for energizing and deenergizing the clutch.

5. In a system of the character described, an electric circuit, a cooling unit including a compressor, an electric motor in said circuit, said motor being coupled to the compressor to drive the same, an electric air heater in the circuit, means for connecting said circuit and motor with an outside source of current for supplying current to the circuit and operating the motor as such to drive the compressor, temperature controlled means in the circuit for throwing the cooling unit into action and the heater out of action and vice versa, said means operating to render the cooling unit inactive without stopping the action of the compressor, an internal combustion motor for driving the electric motor as a generator and driving the compressor therethrough, and means for connecting said internal combustion motor to and disconnecting it from the electric motor.

6. In a system of the character described, an electric circuit, a cooling unit including a compressor, an electric motor in said circuit designed to be driven at an assigned speed, said motor being coupled to the compressor to drive the same, an electric air heater in the circuit, means for connecting said circuit and motor with an outside source of current for supplying current to the circuit and operating the motor as such to drive the compressor, thermally responsive means in the circuit for automatically throwing the cooling unit into action and the heater out of action and vice versa, an internal combustion motor designed to be driven substantially at the same speed as the electric motor for driving the electric motor as a generator and driving the compressor therethrough, said thermally responsive means acting to render the cooling unit inoperative without stopping the action of the compressor, and a clutch for coupling said internal combustion motor to and uncoupling it from the electric motor.

7. In a system of the character described, an electric circuit, a compressor, an A. C. synchronous electric motor in said circuit, said motor being coupled to the compressor to drive the same, means for connecting said circuit and motor with an outside source of current for supplying current to the circuit and operating the motor as such to drive the compressor, an internal combustion motor for driving the electric motor as a generator and driving the compressor therethrough, and means for preventing simultaneous application of outside and internal power to the circuit.

8. In a system of the character described, an electric circuit, a compressor, a synchronous electric motor in said circuit, said motor being coupled to the compressor to drive the same, means for connecting said circuit and motor with an outside source of current for supplying current to the circuit and operating the motor as such to drive the compressor, an internal combustion motor for driving the electric motor as a generator and driving the compressor therethrough, and means for preventing excitation of the field of the motor until the motor in action has reached substantially synchronous speed.

9. In a system of the character described, an electric circuit, a cooling unit including a compressor, an electric motor in said circuit, said motor being coupled to the compressor to drive the same, an electric air heater in the circuit, means for connecting said circuit and motor with an outside source of current for supplying current to the circuit and operating the motor as such to drive the compressor, thermally responsive means in the circuit for manually or automatically at predetermined temperatures throwing the heater into action and the cooling unit out of action and vice versa, an internal combustion motor for driving the electric motor as a generator and driving the compressor therethrough, said thermally responsive means acting to render the cooling unit inoperative at a predetermined temperature without stopping the action of the compressor, and means for connecting said internal combustion motor to and disconnecting it from the electric motor.

10. In a system of the character described, an electric circuit, a compressor, a synchronous motor in said circuit coupled to the compressor to drive the same, an internal combustion motor for driving the synchronous motor as a generator and driving the compressor therethrough, and means for connecting said circuit and synchronous motor with an outside source of current for supplying current to the circuit and operating the synchronous motor as such to drive the compressor.

11. In a system of the character described, an electric circuit, a compressor, a generator in said circuit designed to be driven at any assigned speed, said generator being coupled to the compressor to drive the same, an internal combustion motor designed to be driven at the same speed as the generator to drive the compressor therethrough, an electromagnetic clutch for connecting the internal combustion motor with the generator when the driving motor speed reaches the assigned speed and disconnecting it from the generator at lower speeds, and means in said circuit for controlling said clutch for opening and closing actions.

12. In a system of the character described, an electric circuit, a compressor, a synchronous motor in said circuit designed to be driven at an assigned speed, said motor being coupled to the compressor to drive the same, an internal combustion motor for driving the synchronous motor as a generator and driving the compressor therethrough, means for connecting said circuit and synchronous motor with an outside source of current for supplying current to the circuit and for operating the motor as such and driving the compressor therethrough, an electromagnetic clutch for connecting the internal combustion motor with and disconnecting it from the synchronous motor, and manually controllable means for starting the internal combustion motor and energizing the clutch, said means acting if set into action at the time the synchronous motor is running as a motor to cut off the supply of current from the outside source and energize the clutch.

13. In a system of the character described, an electric circuit, a cooling circuit employing a volatile refrigerant and including a compressor, a synchronous motor coupled to the compressor, a Diesel engine for driving the motor as a generator to charge the circuit and for driving therethrough the compressor, a by-pass for operatively disassociating the compressor from the cooling circuit, and temperature-controlled means in the circuit for controlling the by-pass to throw the by-pass into action at a predetermined temperature and to render it inactive at higher temperatures.

14. In a system of the character described, an electric circuit, a compressor, a synchronous electric motor in said circuit operable also as a generator, said motor being coupled to the compressor to drive the same, a battery in the electric circuit for energizing the field of the synchronous motor, means for connecting said circuit and motor with an outside source of current for supplying current to the circuit and operating the synchronous motor as such to drive the compressor, an internal combustion motor for driving the synchronous motor as a generator and driving the compressor therethrough, means for connecting the electric synchronous motor with an outside source of current, a voltage regulator in the circuit for holding constant voltage when the synchronous motor acts as a generator and maintaining constant line voltage when the synchronous motor is operating as a motor, and means for connecting the internal combustion motor with and disconnecting it from the electric motor.

15. In a system of the character described, an electric circuit, a compressor, a synchronous motor in said circuit, said motor being coupled to the compressor to drive the same, and unloading means for said compressor, means for connecting said circuit and synchronous motor with an outside source of current for supplying current to the circuit and operating the motor as such to drive the compressor, an internal combustion motor for driving the electric motor as a generator and driving the compressor therethrough, means in the circuit for controlling the unloading means, an electrically operated clutch for connecting the internal combustion motor with and disconnecting it from the electric motor, and means for energizing and deenergizing the clutch.

16. In a system of the character described, an electric circuit, a compressor, a synchronous motor in the electric circuit adapted to be operated at an assigned speed and coupled to the compressor for driving the same, an internal combustion motor for driving the synchronous motor as a generator, and means for preventing the application of the full compressor load until the synchronous motor has attained the assigned speed.

17. In a system of the character described, an electric circuit, a compressor, a synchronous motor in the electric circuit coupled to the compressor for driving the same, an internal combustion motor for driving the same as a generator to supply internal power to the electric circuit, an outside source of current for supplying power to the circuit and to the motor to drive the latter as such, and means for preventing simultaneous application of outside and internal power to the electric circuit.

18. In a system of the character described, a main electric circuit, a starter circuit including a starting battery and a rectifier for charging the same from the main circuit, a generator in the main circuit, a compressor, an AC synchronous motor for supplying current to the main circuit and coupled to the compressor to drive the same, an internal combustion motor for driving the synchronous motor as a generator, a magnetic clutch for connecting the internal combustion motor with and disconnecting it from the generator, and means for supplying current from the battery to actuate the starter and energize the magnetic clutch.

WILLIAM S. H. HAMILTON.